United States Patent
Hama (10) Patent No.: US 9,602,692 B2
(45) Date of Patent: Mar. 21, 2017

(54) IMAGE PROCESSING APPARATUS WHICH SUPPORTS MULTIPLE SESSIONS INCLUDING DEEMED VOICE FACSIMILE TRANSMISSION, CONTROL METHOD THEREOF, AND STORAGE MEDIUM

(71) Applicant: CANON KABUSHIKI KAISHA, Tokyo (JP)

(72) Inventor: Mikio Hama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/557,124

(22) Filed: Dec. 1, 2014

(65) Prior Publication Data
US 2015/0181055 A1  Jun. 25, 2015

(30) Foreign Application Priority Data
Dec. 20, 2013  (JP) ................................ 2013-264498

(51) Int. Cl.
  *H04M 11/06*  (2006.01)
  *H04N 1/327*  (2006.01)
  *H04N 1/32*  (2006.01)

(52) U.S. Cl.
  CPC ..... *H04N 1/32797* (2013.01); *H04N 1/32593* (2013.01)

(58) Field of Classification Search
  CPC ............... H04M 11/06; H04N 1/00302; H04N 1/32797; H04N 1/32593
  USPC .... 358/1.15, 1.13, 405; 379/100.12, 100.15; 375/222; 455/335
  See application file for complete search history.

(56) References Cited

U.S. PATENT DOCUMENTS

| | | | | |
|---|---|---|---|---|
| 3,641,272 A | * | 2/1972 | Pinet | H04Q 11/0407 370/362 |
| 2004/0105432 A1 | | 6/2004 | Yamaji | 370/352 |
| 2008/0316543 A1 | * | 12/2008 | Higuchi | H04M 11/066 358/443 |

FOREIGN PATENT DOCUMENTS

JP  3772828  5/2006

* cited by examiner

Primary Examiner — Jamares Q Washington
(74) Attorney, Agent, or Firm — Fitzpatrick Cella Harper & Scinto

(57) ABSTRACT

An image processing apparatus includes an SLIC configured to control an analog telephone, a plurality of modems configured to control facsimile communication using deemed voice, a plurality of PCMI/Fs configured to input and output encoded voice data, and a plurality of selectors configured to connect any of the SLIC and the plurality of modems to one of the plurality of PCMI/Fs, and controls the plurality of selectors according to requested processing to connect the SLIC and one of the plurality of modems to one of the plurality of PCMI/Fs, thereby performing the processing.

12 Claims, 9 Drawing Sheets

|  | SEL_A | SEL_B | SEL_C |
|---|---|---|---|
| PERFORM FAX TRANSMISSION AND RECEPTION SIMULTANEOUSLY USING DIGITAL MODEM 1 AND DIGITAL MODEM 2 | (1) | (1) | N/A |
| PERFORM FAX TRANSMISSION AND RECEPTION USING DIGITAL MODEM 1 AND SIMULTANEOUSLY PERFORM CALL USING SLIC | (1) | (2) | (2) |
| PERFORM FAX TRANSMISSION AND RECEPTION USING DIGITAL MODEM 2 AND SIMULTANEOUSLY PERFORM CALL USING SLIC | (2) | (1) | (1) |

FIG. 7B

IMAGE PROCESSING APPARATUS WHICH SUPPORTS MULTIPLE SESSIONS INCLUDING DEEMED VOICE FACSIMILE TRANSMISSION, CONTROL METHOD THEREOF, AND STORAGE MEDIUM

BACKGROUND OF THE INVENTION

Field of the Invention

The present invention relates to an image processing apparatus for performing facsimile communication using deemed voice, a control method thereof, and a storage medium.

Description of the Related Art

Recently, facsimile (FAX) transmission over IP networks, which are high-speed network, is becoming widely used. There are two methods in FAX transmission over an IP network. One of the methods is a transmission standard called ITU-T recommendation T.38 in which signals that are transmitted using the T.30 protocol are transmitted as digital signals without conversion, this method allowing the transmission to be performed at higher speed than T.30. The other is a transmission method using deemed voice, using the ITU-T recommendation T.30 protocol. This is a method in which data digitally modulated into analog signals by a modem and further voice-packetized by a voice codec (CODEC) is transmitted, and is called deemed voice transmission (Inband signaling) because the transmission is performed deeming T.30 analog signals to be voice signals.

In deemed voice transmission having the above-described configuration, it is necessary to modulate digital signals of transmission data into analog signals and further to voice-packetize the obtained signals using voice codec. Alternatively, it is necessary to decode voice packets of received data using voice codec and further to demodulate the obtained signals into digital signals, and, thus, a digital modem with built-in voice codec has been devised that can perform digital input and output. Examples of the voice packet encoding method include ITU-T recommendation G.711 and the like, the RTP (real time protocol) is used as the transmission protocol, and connection to a bus is established via a PCM I/F or the like.

These two methods use the SIP (session initiation protocol), and point-to-point transmission over an IP network is realized. Examples of the IP network include a digital public network called NGN (Next Generation Network) provided by NTT, a private IP line using an IP private branch exchanger (IP-PBX), and the like. In particular, in the case of the NGN, bandwidth guarantee, security management, and the like are performed, and, thus, high-speed and secure image transmission can be realized. In the NGN, 1 Mbps at a maximum is guaranteed, which realizes transmission that is about 30 times faster than a conventional public switched telephone network (PSTN).

Furthermore, an IP telephone is known that realizes a call by packetizing and encoding voice and transmitting and receiving it over an IP network. Using this technique, a call can be realized using a handset and a slave telephone (hereinafter, they may be collectively referred to as a "handset") of a fax machine. In order to connect a handset to an IP network, an SLIC (subscriber line interface circuit: also referred to as a "subscriber line connection circuit") for connecting the telephone to the IP network is used. An SLIC is used typically for encoding analog voice into voice packets, detecting hooking of a telephone, identifying dialing signals and the like from a telephone, ringing control of a telephone, or the like. An input and output I/F of an SLIC is for digitalized voice signals as in the case of a digital modem, examples of the voice signal encoding method include ITU-T recommendation G.711 and the like, the RTP (real time protocol) is used as the transmission protocol, and connection to a bus is established via a PCM I/F or the like.

A handset of a fax machine is often used for manual transmission after a call, and, thus, manual transmission has to be supported also in the above-described deemed voice transmission. The manual transmission mode is a mode in which, at the time of transmission, the other party's phone number is input using a connected handset or slave telephone, and, after conversation with the other party, a fax document is immediately transmitted without hanging up the telephone. This mode is advantageous in that wrong transmission can be prevented because a fax document can be transmitted after conversation with the other party. As described above, when realizing manual transmission in the deemed voice transmission, it is necessary to selectively use an SLIC for a call using a handset, and a digital modem for FAX communication. That is to say, it is necessary to select whether a PCM I/F is to be connected to an SLIC or to a digital modem.

Furthermore, in order to establish connection simultaneously to a plurality of connection destinations in a PSTN, it is necessary to connect modular cables in the same number as the number of lines, but, in the case of deemed voice transmission using an IP line, connection of one network cable is sufficient to establish connection simultaneously to a plurality of connection destinations and realize communication and calls. In such a multi-session environment, for example, in SIP, one connection session is from INVITE to BYE. A first connection is session 1, and its next connection is session 2, that is, the connection is not associated with a physical line.

Japanese Patent No. 3772828 discloses the configuration that switches the connection destination between an SLIC and a digital modem, using a switch. Specifically, this is a technique in which, using a switch, an incoming call to a fixed-line telephone is connected to a fixed-line telephone and an incoming call to an IP telephone is connected via a VoIP gateway to a fixed-line telephone, wherein connection is established to a digital modem if the transmission source is a fax machine, and is established to an SLIC if the transmission source is not a fax machine. However, no description is made of FAX communication using deemed voice realizing the functions such as manual transmission, or of control of a plurality of digital modems.

The above-described conventional technique has a following problem. A fax machine supporting multi-sessions includes digital modems in the same number as the number of sessions necessary for FAX and communication connected simultaneously with the FAX. For example, a fax machine capable of performing simultaneous communication in two sessions includes two digital modems. However, the number of people who can simultaneously use a handset or a slave telephone is one, and the number of handsets or slave telephones connected to the fax machine is typically one. Accordingly, the fax machine includes only one SLIC for controlling the telephone functions. Thus, when performing multi-sessions including deemed voice transmission over an IP network, two digital modems have to exclusively use one SLIC. That is to say, when performing manual transmission, an SLIC is used in a call, and a digital modem is used in subsequent FAX transmission. Thus, it is required that both of the two digital modems be capable of being combined with the SLIC for realizing manual transmission.

SUMMARY OF THE INVENTION

The present invention enables realization of a mechanism that performs facsimile manual transmission by allowing two digital modems to properly use one SLIC, in an environment in which multi-sessions including deemed voice transmission over an IP network can be performed.

One aspect of the present invention provides an image processing apparatus capable of simultaneously performing a plurality of sessions at least including a voice call and facsimile communication using deemed voice, comprising: a telephone control unit configured to control an analog telephone; a plurality of modems configured to control the facsimile communication using deemed voice; a plurality of pulse code modulation units configured to input and output encoded voice data; a plurality of selectors configured to connect any of the telephone control unit and one of the plurality of modems to any of the plurality of pulse code modulation units; and a control unit configured to control the plurality of selectors according to requested processing to connect any of the telephone control unit and the plurality of modems to any of the plurality of pulse code modulation units, thereby performing the processing.

Another aspect of the present invention provides a method for controlling an image processing apparatus capable of simultaneously performing a plurality of sessions at least including a voice call and facsimile communication using deemed voice, including a telephone control unit configured to control an analog telephone, a plurality of modems configured to control the facsimile communication using deemed voice, a plurality of pulse code modulation units configured to input and output encoded voice data, and a plurality of selectors configured to connect any of the telephone control unit and one of the plurality of modems to any of the plurality of pulse code modulation units, the method comprising causing a control unit to control the plurality of selectors according to requested processing to connect any of the telephone control unit and the plurality of modems to any of the plurality of pulse code modulation units, thereby performing the processing.

Another aspect of the present invention provides a non-transitory computer-readable storage medium storing a computer program, for causing a computer to function as the image processing apparatus.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Configuration of the Image Processing Apparatus

Hereinafter, an embodiment of the present invention will be described with reference to FIGS. 1 to 7. First, the schematic configuration of an image processing apparatus used in the present invention will be described with reference to FIG. 1.

Figure 1:
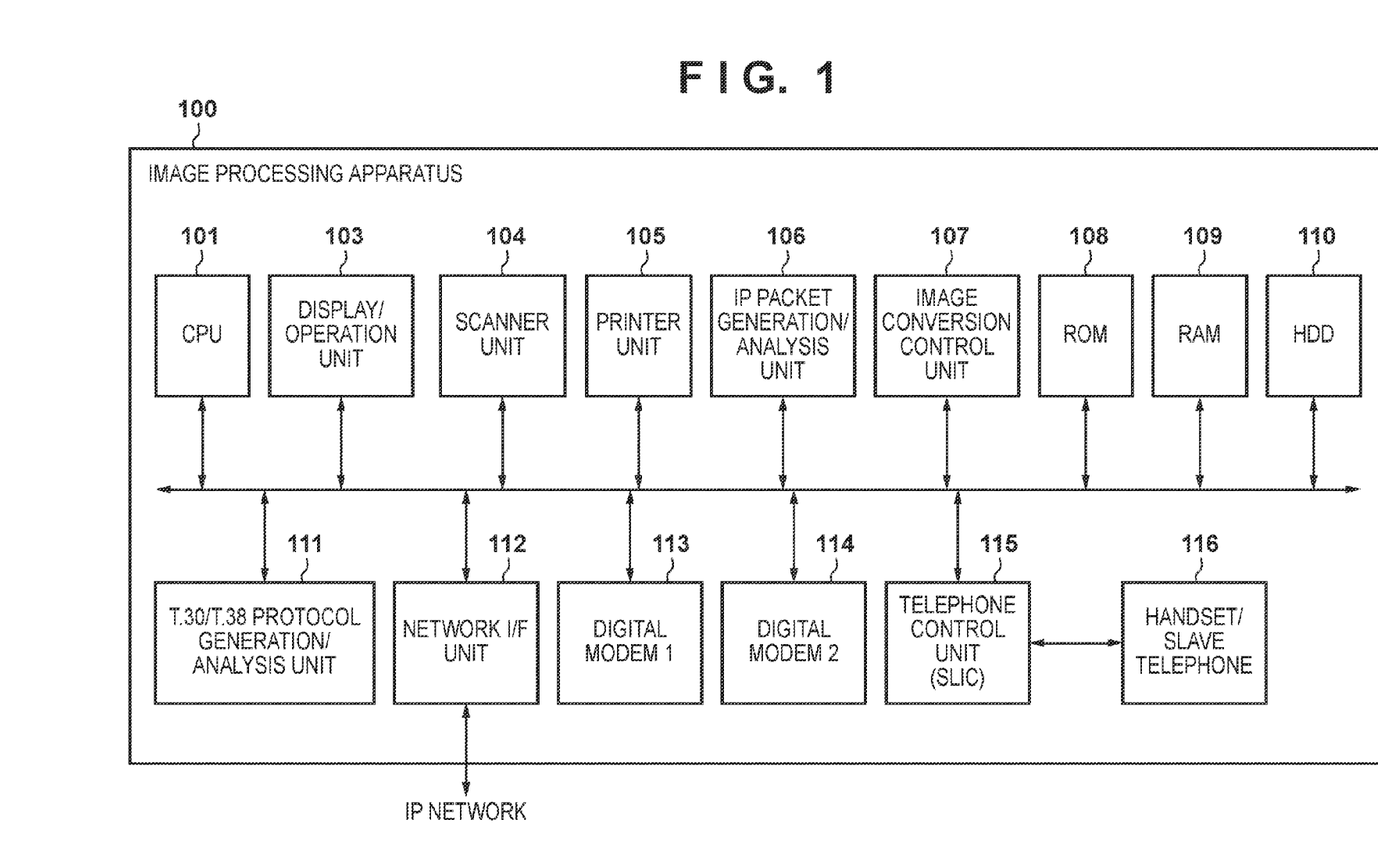
FIG. 1 is a schematic configuration diagram of an image processing apparatus according to the present invention.

An image processing apparatus 100 includes a CPU 101, a display/operation unit 103, a scanner unit 104, a printer unit 105, an IP packet generation/analysis unit 106, an image conversion control unit 107, a ROM 108, a RAM 109, an HDD 110, a T.30/T.38 protocol generation/analysis unit 111, a network I/F unit 112, digital modems 113 and 114, a telephone control unit (SLIC: subscriber line interface circuit: subscriber line connection circuit) 115, and a handset/slave telephone 116. The image processing apparatus 100 is connected via the network I/F unit 112 to an IP network 102.

The CPU 101 controls the devices in the image processing apparatus 100 based on control programs stored in the ROM 108. The ROM 108 stores various control programs and data. The RAM 109 has a work area for the CPU 101, a save region for data during error handling, a load area for control programs, and the like. The HDD 110 stores various control programs and print data.

The IP network 102 is an intranet, a public IP network, or the like. The display screen of the display/operation unit 103 displays, for example, windows, icons, messages, menus, and other user interface information. The display/operation unit 103 is configured by various keys for allowing the user to perform copy, FAX, or printing operation, and a screen pointing device for operating icons, menus, and the like on the display screen.

The scanner unit 104 scans a document. The printer unit 105 prints print data stored in the RAM 109 or the HDD (hard disk drive) 110. The T.30/T.38 protocol generation/analysis unit 111 has the functions of generating facsimile transmission information using the ITU-T recommendation T.30/T.38 protocol, and retrieving the facsimile transmission information from the received protocol. The IP packet generation/analysis unit 106 has the functions of mapping the ITU-T recommendation T.30/T.38 protocol in an IP packet, and retrieving the ITU-T recommendation T.30/T.38 protocol from the received IP packet. The image conversion control unit 107 performs compression and expansion, magnification and reduction, and linear density conversion of images for FAX communication.

The NIC (network interface controller) 112 is a network unit I/F through which connection to the IP network is established. The digital modems (MODEMs) 113 and 114 are FAX communication control units (modulator-demodulator units (digital modem 1 and digital modem 2)) for transmitting and receiving FAX signals. The SLIC (subscriber line interface circuit: subscriber line connection circuit) 115 is a circuit for realizing the telephone function by encoding and decoding voice signals. The SLIC has an A/D conversion unit and a D/A conversion unit for encoding and decoding voice formats G.711 and G.729.

For example, if FAX transmission using deemed voice is performed over the IP network, a document image scanned by the scanner unit 104 is stored in the RAM 109, and is then converted by the image conversion control unit 107. Subsequently, the image is modulated by the digital modem 113, is IP packetized by the IP packet generation/analysis unit 106, and is then sent by the network I/F unit 112 to the IP network 102.

Circuit Configuration

Figure 2:
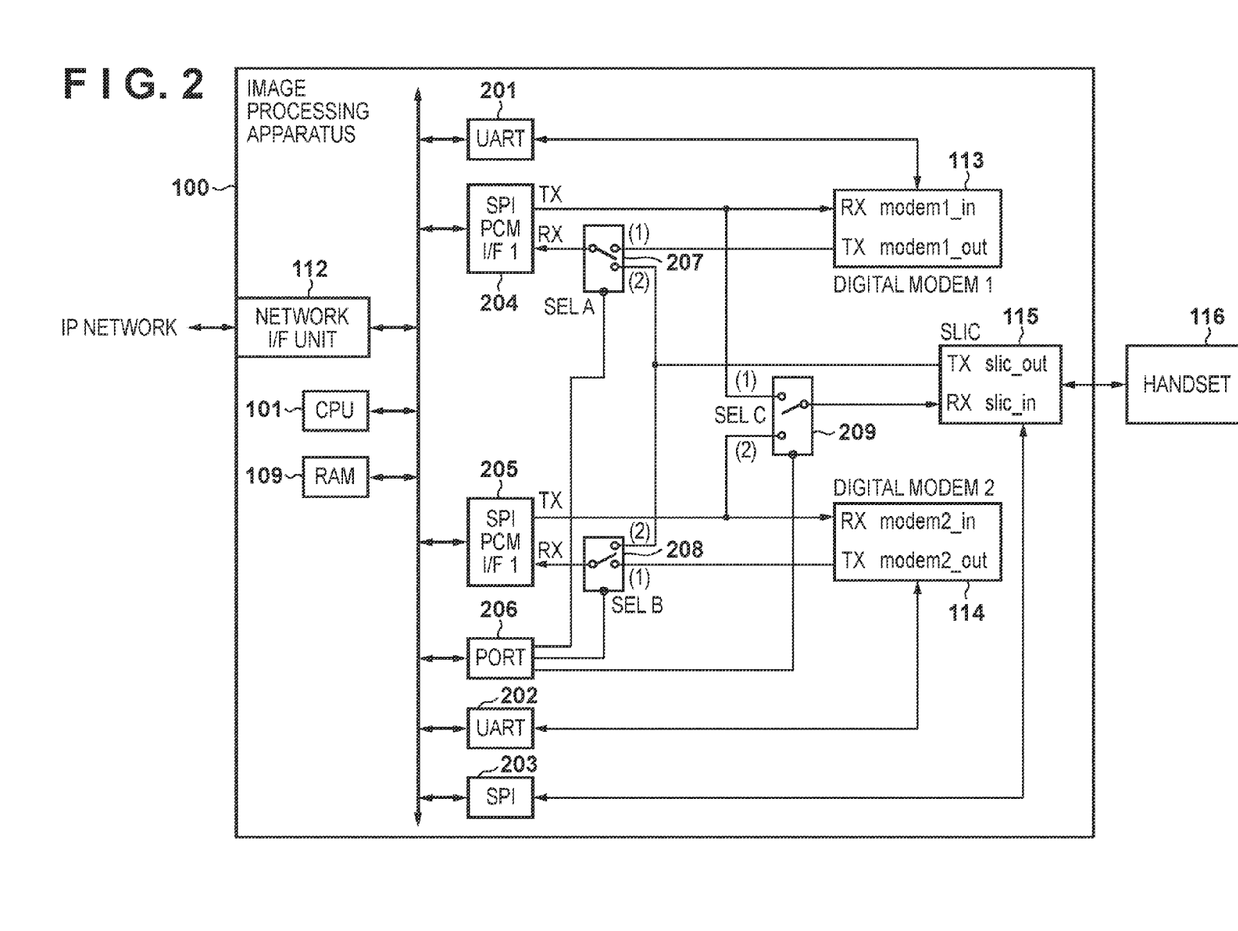
FIG. 2 is a configuration diagram of the main portion according to the present invention.

Next, the circuit configuration for allowing the two digital modems 113 and 114 to exclusively use the SLIC 115 will be described with reference to FIG. 2. In the case of manual transmission using the handset 116, the SLIC 115 and the handset 116 are used. First, the circuit configuration including the digital modems 113 and 114 and the SLIC 115 will be described in detail with reference to FIG. 2.

In the diagram, 201 denotes a control I/F for the digital modem 113, where a UART (universal asynchronous receiver transmitter) is used. In a similar manner, 202 denotes a control I/F for the digital modem 114, where a UART is used. The UARTs 201 and 202 are used for transmitting image data at the time of control command or FAX transmission using an AT command or the like to the digital modems 113 and 114, or for receiving image data from the digital modems 113 and 114 at the time of FAX reception.

Further, 203 denotes a control I/F for the SLIC 115, where a three-line serial I/F (SPI) is used. The CPU 101 transmits a control command via the SPI 203 to the SLIC 115. It is notified from the SLIC 115 that the handset is in an off-hook state or in an on-hook state, for example.

Further, 204 denotes a PCM (pulse code modulation) I/F 1, and 205 denotes a PCM I/F 2. In this embodiment, the PCM I/Fs are, for example, three-line serial I/Fs such as SPIs. The PCM I/Fs 204 and 205 are used for inputting and outputting digitalized voice data to and from the digital modems 113 and 114 or the SLIC 115.

Further, 206 denotes a port for controlling a selector A207, a selector B208, and a selector C209 (described later). The digital modems 113 and 114 and the SLIC 115 can be connected to the PCM I/Fs 204 and 205 by switching the selector A207, the selector B208, and the selector C209. These selectors are switches that operate as follows when being switched to the (1) side or the (2) side in FIG. 2. In this manner, the CPU 101 controls the port 206, thereby controlling the circuit status of the circuit configuration shown in FIG. 2, and realizing exclusive use of the SLIC 115.

If the CPU 101 controls the port 206 to set the selector A207 to (1), the RX input side of the PCM I/F 204 and the TX output side of the digital modem 113 are connected. Furthermore, if the selector is set to (2), the RX input side of the PCM I/F 204 and the TX output side of the SLIC 115 are connected. If the CPU 101 controls the port 206 to set the selector B208 to (1), the RX input side of the PCM I/F 205 and the TX output side of the digital modem 114 are connected. Furthermore, if the selector is set to (2), the RX input side of the PCM I/F 205 and the TX output side of the SLIC 115 are connected.

If the CPU 101 controls the port 206 to set the selector C209 to (1), the TX output side of the PCM I/F 204 and the RX input side of the SLIC 115 are connected. Simultaneously, the TX output side of the PCM I/F 204 and the RX input side of the digital modem 113 are also connected. If the CPU 101 controls the port 206 to set the selector C209 to (2), the TX output side of the PCM I/F 205 and the RX input side of the SLIC 115 are connected. Simultaneously, the TX output side of the PCM I/F 205 and the RX input side of the digital modem 114 are also connected.

Hereinafter, control in the flow of analog modulation using the digital modems 113 and 114 and voice packetization will be described. In the image transmission, the CPU 101 transmits image data compressed by the JBIG or the like to the digital modems 113 and 114, using the UARTs 201 and 202, which are control I/Fs for the digital modems. The digital modems 113 and 114 modulate image data into analog signals, and further encode the obtained signals into G.711 or the like using voice codec. The CPU 101 receives the voice data at the PCM I/Fs 204 and 205, and sends it from the network I/F unit 112. Meanwhile, in the image reception, the opposite operation is performed, that is, voice data in G.711 or the like received from the network I/F unit 112 is transmitted from the PCM I/Fs 204 and 205 to the digital modems 113 and 114. The digital modems decode the voice packet and further perform digital demodulation, so as to obtain image data compressed by the JBIG or the like. The CPU 101 receives the image data from the digital modems 113 and 114 at the UARTs 201 and 202.

Next, control in the flow of voice packetization of analog voice using the SLIC 115 will be described. In the voice transmission, analog voice is transmitted from the handset 116 to the SLIC 115. The analog voice is encoded by the SLIC 115 into G.711 or the like. The CPU 101 receives the voice data at the PCM I/Fs 204 and 205, and sends it from the network I/F unit 112. In the voice reception, voice data in G.711 or the like received from the network I/F unit 112 is transmitted from the PCM I/Fs 204 and 205 to the SLIC 115. The voice data is decoded by the SLIC 115 into analog voice and is output as voice from the handset 116.

Status A

Figure 3:
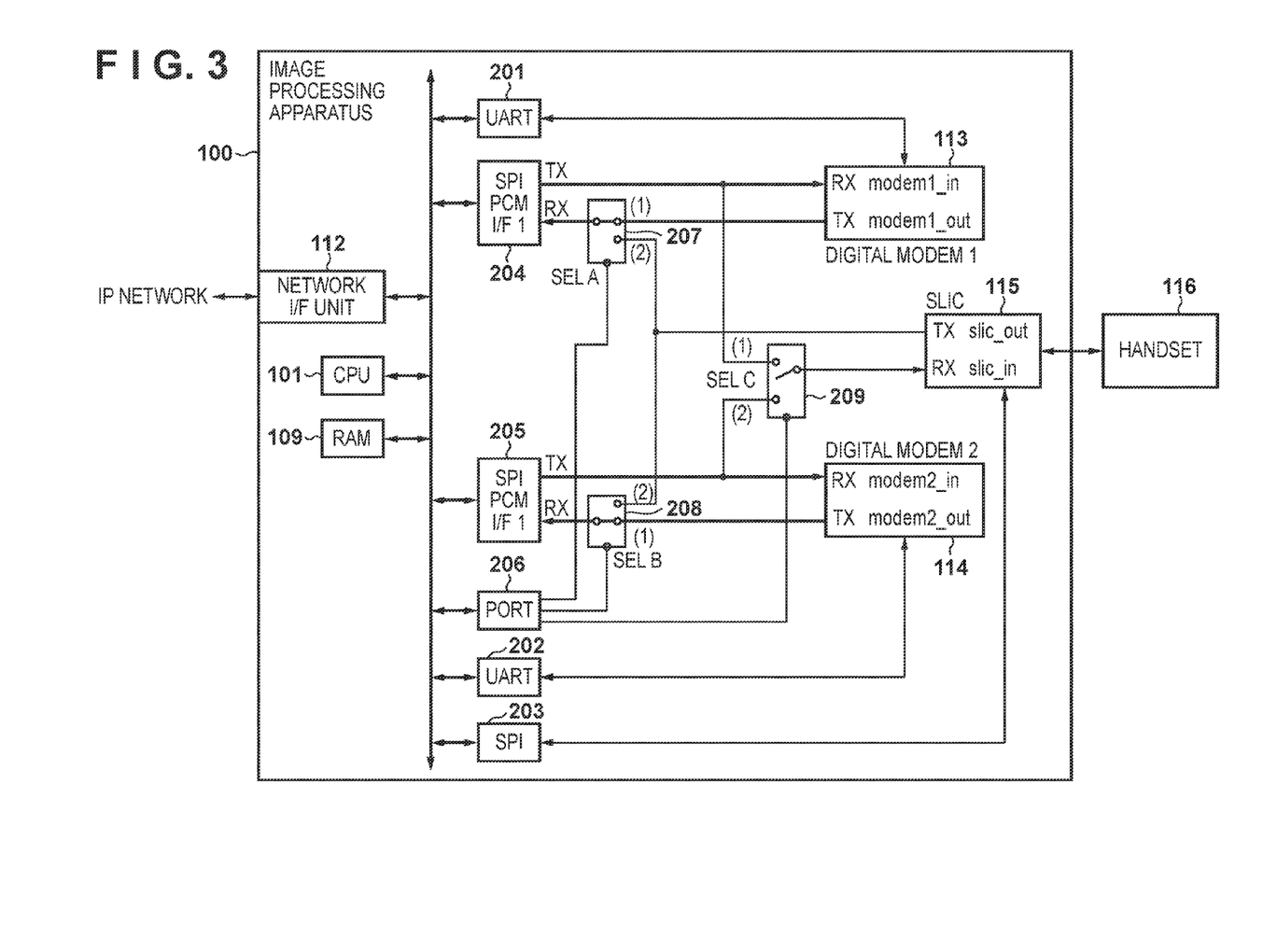
FIG. 3 is a configuration diagram of the main portion according to the present invention.

Hereinafter, the circuit status shown in FIG. 3 will be described. FIG. 3 shows the status in which the selector A207 is set to (1) and the selector B208 is set to (1). This status is referred to as a status A. In the status A, the selector C may be set to either side. The status A is a status used for performing FAX communication simultaneously in two sessions.

In the status A, the RX input side of the PCM I/F 204 and the TX output side of the digital modem 113 are connected, and the TX output side of the PCM I/F 204 and the RX input side of the digital modem 113 are connected. Furthermore, the RX input side of the PCM I/F 205 and the TX output side of the digital modem 114 are connected, and the TX output side of the PCM I/F 205 and the RX input side of the digital modem 114 are connected.

Accordingly, in the status A, it is possible to perform FAX transmission and reception simultaneously in two sessions using the digital modem 113 and the digital modem 114. It will be appreciated that it is also possible to perform FAX transmission and reception in one session using only the digital modem 113, or to perform FAX transmission and reception in one session using only the digital modem 114.

Status B

Figure 4:
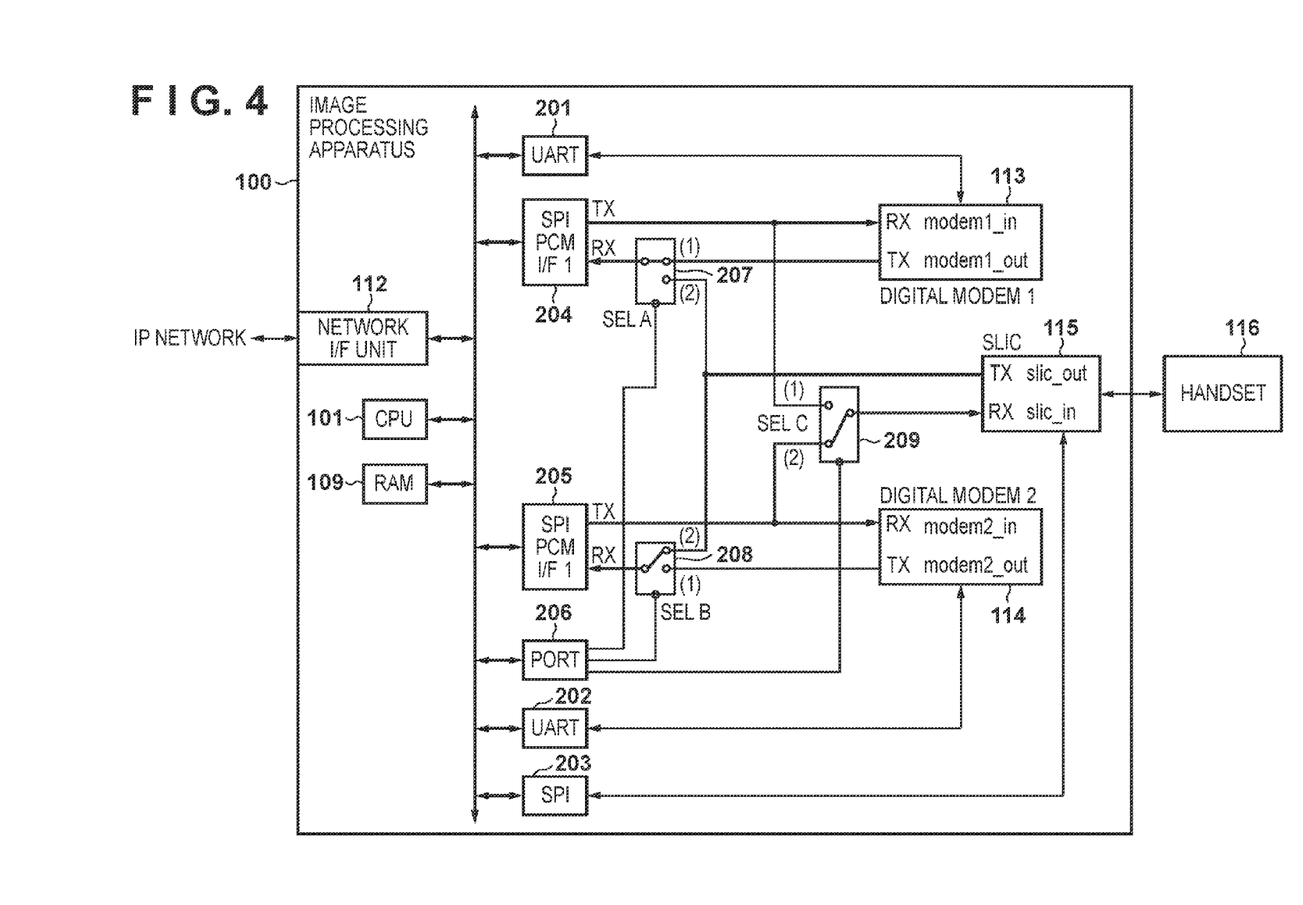
FIG. 4 is a configuration diagram of the main portion according to the present invention.

Hereinafter, the circuit status shown in FIG. 4 will be described. FIG. 4 shows the status in which the selector A207 is set to (1), the selector B208 is set to (2), and the selector C209 is set to (2). This status is referred to as a status B. The status B is a status used mainly for performing a call using the SLIC 115 while performing FAX communication using the digital modem 113.

In the status B, the RX input side of the PCM I/F 204 and the TX output side of the digital modem 113 are connected, and the TX output side of the PCM I/F 204 and the RX input side of the digital modem 113 are connected. Furthermore, the RX input side of the PCM I/F 205 and the TX output side of the SLIC 115 are connected, and the TX output side of the PCM I/F 205 and the RX input side of the SLIC 115 are connected.

Accordingly, in the status B, it is possible to simultaneously perform FAX transmission and reception using the digital modem 113 and a call using the handset using the SLIC 115. It will be appreciated that it is also possible to perform FAX transmission and reception in one session using only the digital modem 113, or to perform a call using only the SLIC 115.

Status C

Figure 5:
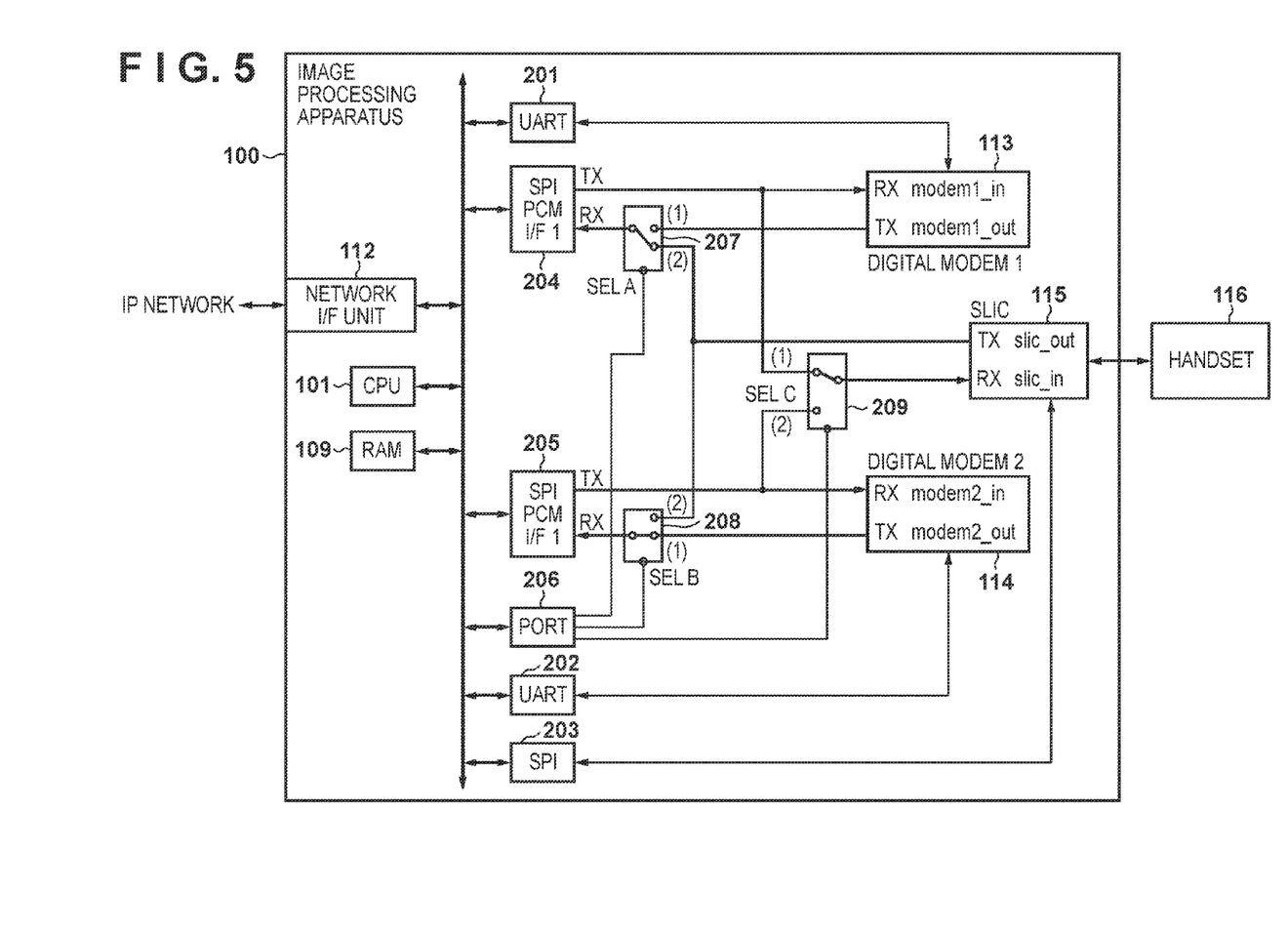
FIG. 5 is a configuration diagram of the main portion according to the present invention.

Hereinafter, the circuit status shown in FIG. 5 will be described. FIG. 5 shows the status in which the selector A207 is set to (2), the selector B208 is set to (1), and the selector C209 is set to (1). This status is referred to as a status C. The status C is a status used mainly for performing a call using the SLIC 115 while performing FAX communication using the digital modem 114.

In the status C, the RX input side of the PCM I/F 204 and the TX output side of the SLIC 115 are connected, and the TX output side of the PCM I/F 204 and the RX input side of the SLIC 115 are connected. Furthermore, the RX input side of the PCM I/F 205 and the TX output side of the digital modem 114 are connected, and the TX output side of the PCM I/F 205 and the RX input side of the digital modem 114 are connected.

Accordingly, in the status C, it is possible to simultaneously perform FAX transmission and reception using the digital modem 114 and a call using the handset using the SLIC 115. It will be appreciated that it is also possible to perform FAX transmission and reception in one session using only the digital modem 114, or to perform a call using only the SLIC 115.

Selectors and Operations

Figure 6:
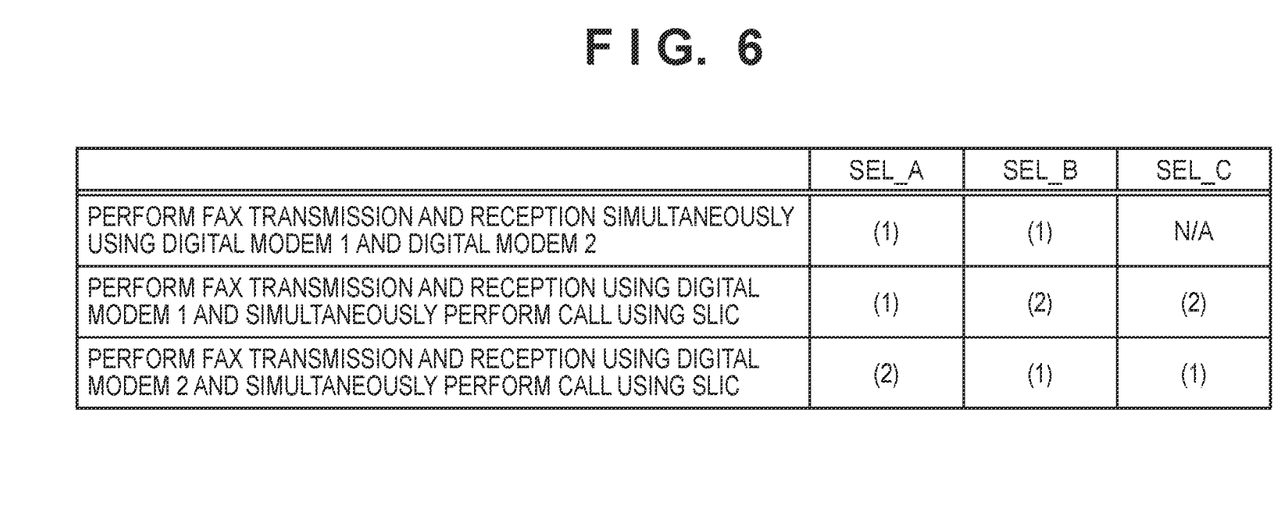
FIG. 6 is a table showing the SW statuses of selectors according to the present invention.

Next, the setting of the selectors and the operation statuses will be described with reference to FIG. 6. The image processing apparatus 100 can realize the above-described statuses A, B, and C by switching the selectors 207, 208, and 209, and can perform FAX manual transmission simultaneously in two sessions by switching the statuses. Below, an actual operation will be described with reference to FIG. 6. The table shown in FIG. 6 shows the status information indicating the circuit status, and is desirably stored in advance in the ROM 108. The CPU 101 sets the circuit status in accordance with a predetermined operation with reference to this table.

As shown in FIG. 6, in order to perform FAX transmission and reception simultaneously in two sessions using the digital modems 113 and 114, the selector A207 is set to (1), and the selector B208 is set to (1). In order to perform FAX transmission and reception using the digital modem 113 and simultaneously perform a call using the SLIC 115, the selector A207 is set to (1), the selector B208 is set to (2), and the selector C209 is set to (2). In order to perform FAX transmission and reception using the digital modem 114 and simultaneously perform a call using the SLIC 115, the selector A207 is set to (2), the selector B208 is set to (1), and the selector C209 is set to (1).

Note information (PCM I/F use status) indicating which of the PCM I/Fs 204 and 205 is used to perform communication or a call is always held in the RAM 109 by the CPU 101. Alternatively, since the digital modem 113 uses the PCM I/F 204 and the digital modem 114 uses the PCM I/F 205, information indicating which of the digital modems is used may be held in the RAM 109.

Processing Procedure

Figure 7A:
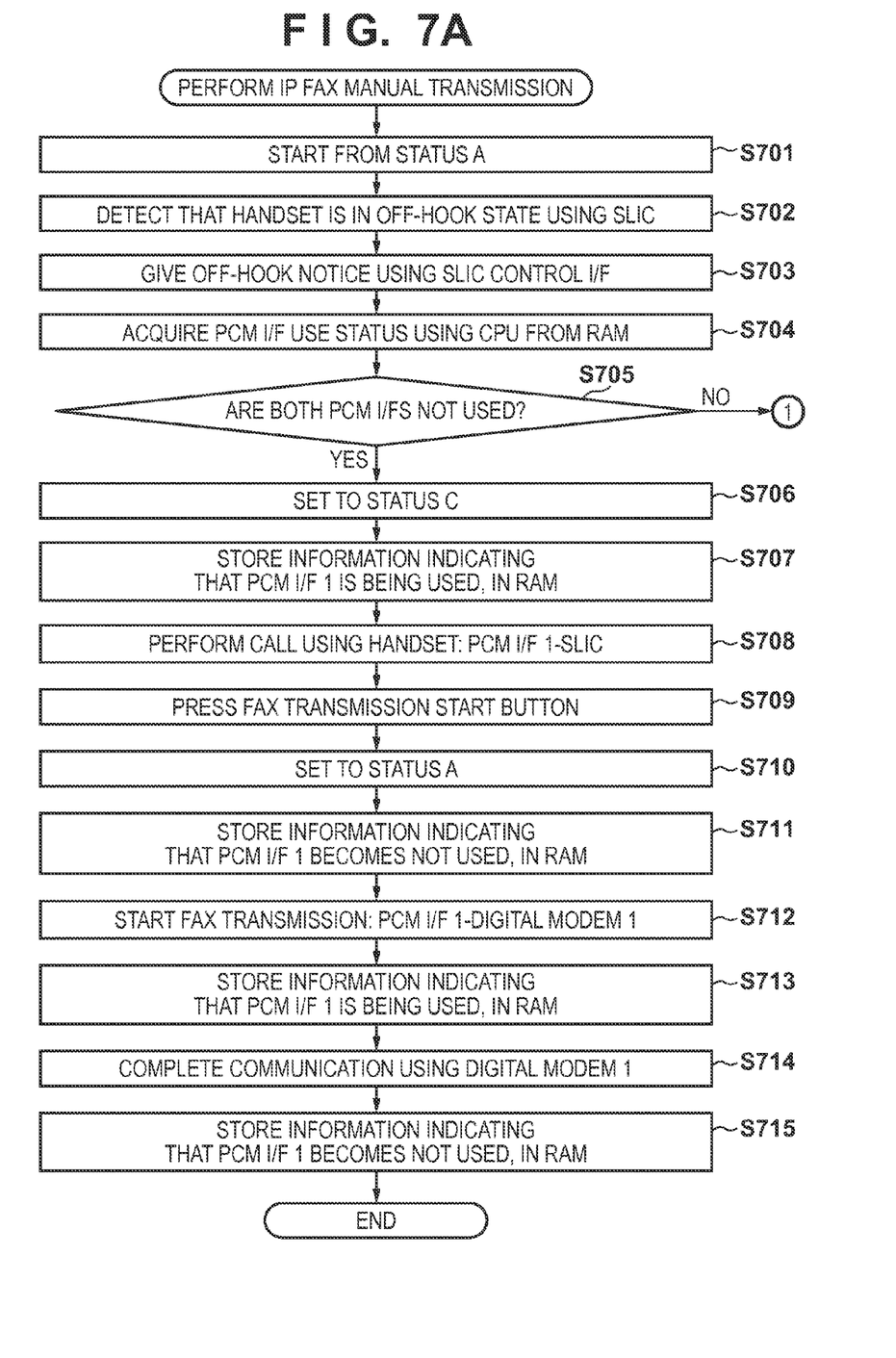
FIGS. 7A to 7C are flowcharts showing an operation according to the present invention.
Figure 7B:
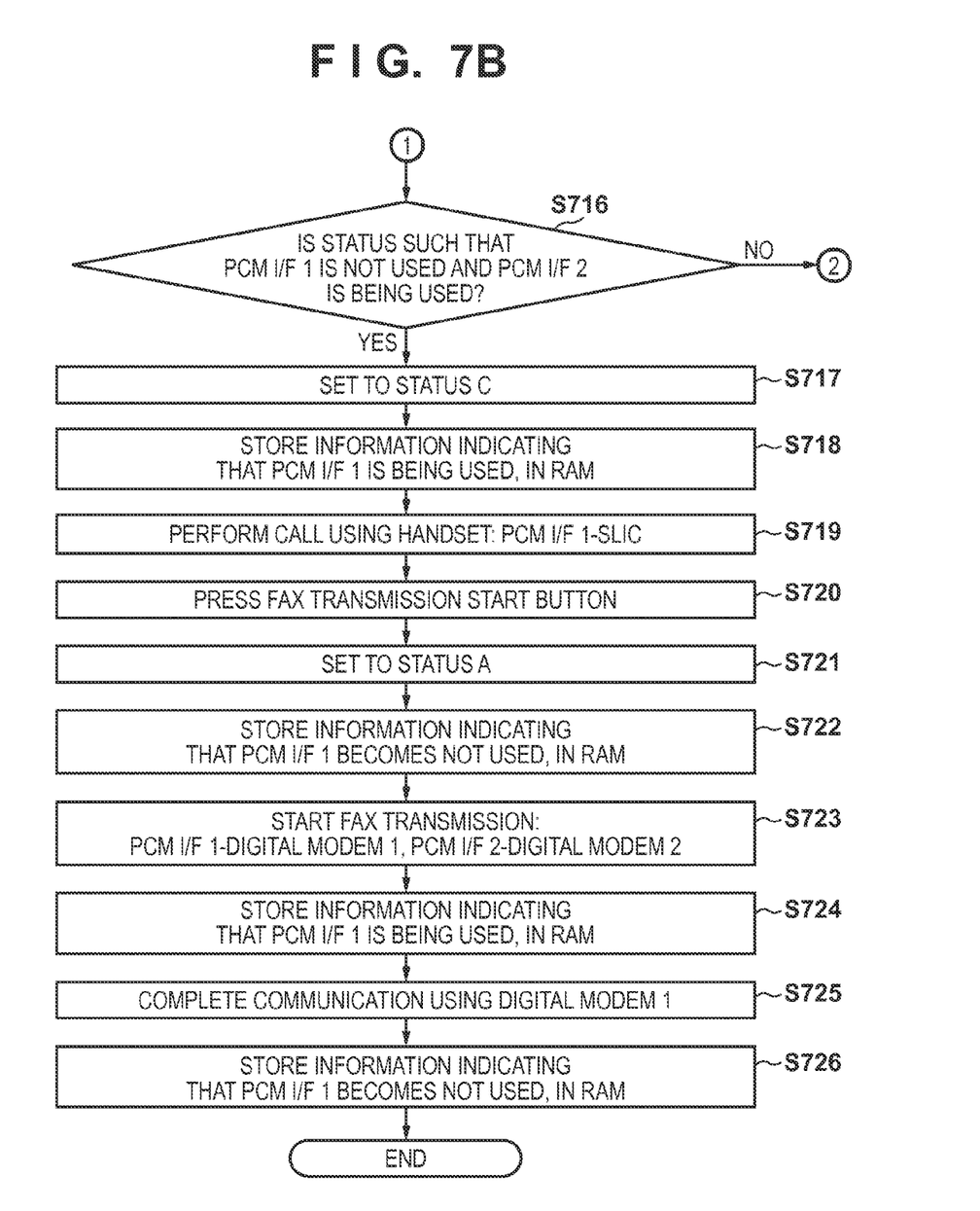
Figure 7C:
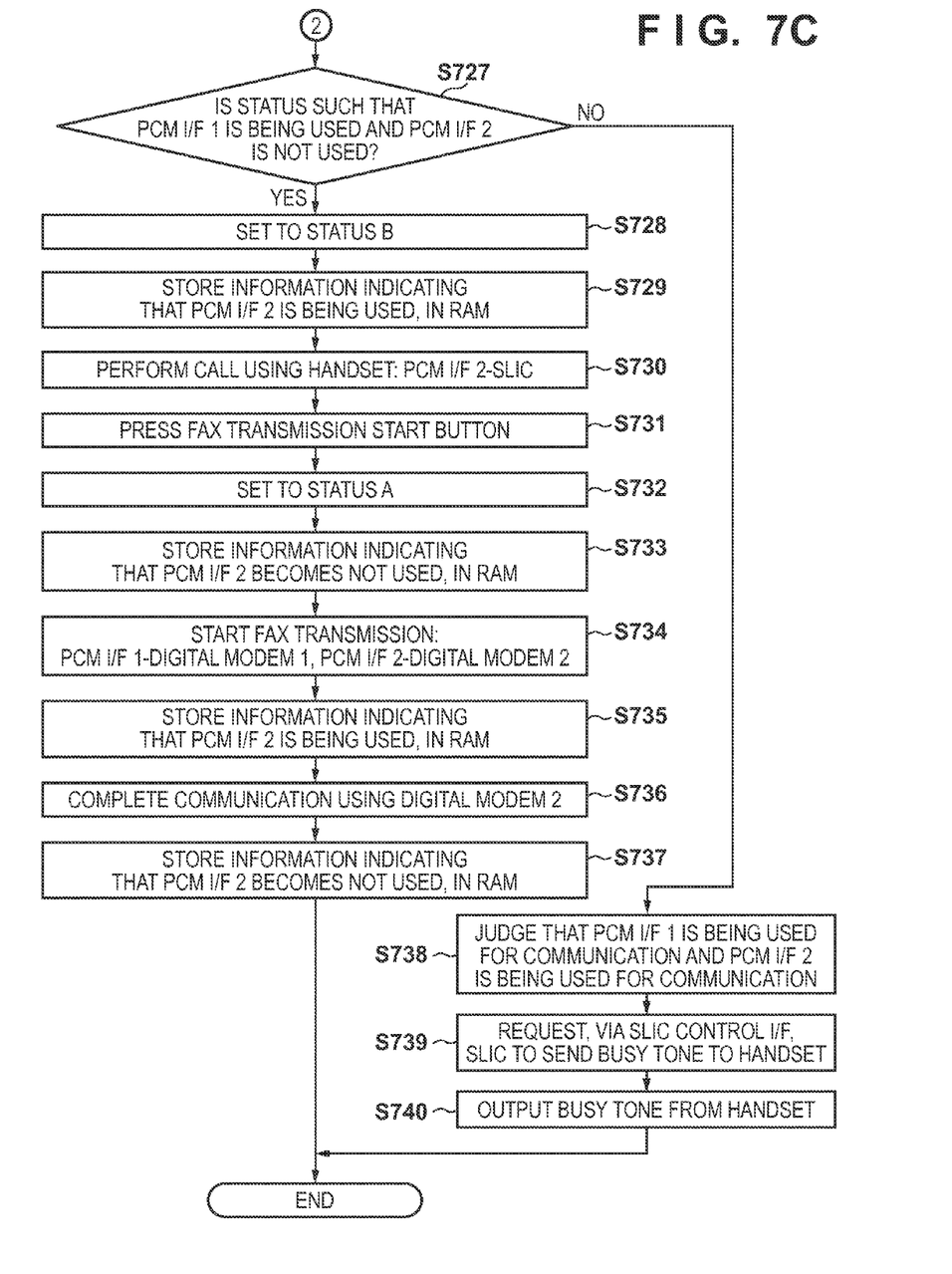

Next, the processing procedure for performing a predetermined operation by switching the statuses A to C will be described with reference to FIGS. 7A to 7C. The processing described below is realized by the CPU 101 reading a control program stored in the ROM 108, the HDD 110, or the like into the RAM 109 and executing the program. The user tries to perform FAX manual transmission.

In S701, the operation is started from the initial status. In the initial status, the circuit status of the image processing apparatus 100 is the status A shown in FIG. 3. In S702, if the user puts the handset 116 in an off-hook state, the SLIC 115 detects that the handset is in an off-hook state, and notifies the CPU 101 of it via the SPI 203 in S703. In S704, the CPU 101 notified that the handset is in an off-hook state acquires the PCM I/F use status from the RAM 109.

As a result of the acquisition, in S705, the CPU 101 judges that FAX communication is not currently being performed if neither of the PCM I/F 204 and the PCM I/F 205 is used, and the procedure advances to S706. Otherwise, the procedure advances to S716. In S706, in order to perform a call using the SLIC 115 using the PCM I/F 204, the CPU 101 controls the port 206 to set the circuit status to the status C shown in FIG. 5. In this case, the PCM I/F 205 also may be used because neither PCM I/F is used, but it is assumed that the PCM I/F 204 is to be used if neither PCM I/F is used in any sessions. Simultaneously, in S707, the CPU 101 stores information indicating that the PCM I/F 204 is being used, in the RAM 109. That is to say, in this case, information indicating that the PCM I/F 204 is being used may be updated as the status information indicating the current circuit status, or information indicating the settings or the like of each selector may be updated in the RAM 109. The same is applied to update of the status information described later.

In S708, the CPU 101 causes analog voice from the handset 116 to be digitalized and voice-packetized by the SLIC 115 and to be input to the PCM I/F 204. The voice packet input from the network I/F unit 112 is output from the PCM I/F 204, is decoded and analogized by the SLIC 115, and is heard via the handset 116 by the user.

In S709, the CPU 101 detects that the user has pressed a FAX transmission start button in order to perform FAX transmission. In S710, the CPU 101 controls the port 206 to set the circuit status to the status A shown in FIG. 3. Simultaneously, in S711, information indicating that the PCM I/F 204 becomes not used is stored in the RAM 109. In S712, the CPU 101 starts FAX transmission using the digital modem 113, using the PCM I/F 204. Simultaneously, in S713, the CPU 101 stores again information indicating that the PCM I/F 204 is being used, in the RAM 109. In S714, it is detected that the FAX transmission is completed. Simultaneously, in S715, the CPU 101 stores information indicating that the PCM I/F 204 becomes not used, in the RAM 109.

In S716, the CPU 101 determines whether or not the status is such that the PCM I/F 204 is not used and the PCM I/F 205 is being used. If the determination result is Yes, it is judged that FAX communication using the digital modem 114 has been already performed, and the procedure advances to S717. If not, the procedure advances to S727.

In S717, in order to perform a call using the SLIC 115 using the PCM I/F 204, the CPU 101 sets the circuit status to the status C shown in FIG. 5. Simultaneously, in S718, the CPU 101 stores information indicating that the PCM I/F 204 is being used, in the RAM 109. In S719, the CPU 101 performs a voice call as in S708 using the SLIC 115 and the handset 116, using the PCM I/F 204, and, in S720, it is detected that the user has pressed the FAX transmission start button in order to perform FAX transmission.

In S721, the CPU 101 controls the port 206 to set the circuit status to the status A shown in FIG. 3. Simultaneously, in S722, the CPU 101 stores information indicating that the PCM I/F 204 becomes not used, in the RAM 109. In S723, the CPU 101 starts FAX transmission using the digital modem 113, using the PCM I/F 204. Simultaneously, in S724, the CPU 101 stores again information indicating that the PCM I/F 204 is being used, in the RAM 109. In S725, the CPU 101 detects that the FAX transmission is completed. Simultaneously, in S726, information indicating that the PCM I/F 204 becomes not used is stored again in the RAM 109.

In S727, the CPU 101 determines whether or not the status is such that the PCM I/F 204 is being used and the PCM I/F 205 is not used. If the determination result is Yes, it is judged that FAX communication using the digital modem 113 has been already performed, and the procedure advances to S728. If not, the procedure advances to S738.

In S728, in order to perform a call using the SLIC 115 using the PCM I/F 205, the CPU 101 sets the circuit status to the status B shown in FIG. 4. Simultaneously, in S729, the CPU 101 stores information indicating that the PCM I/F 205 is being used, in the RAM 109. In S730, the CPU 101 performs a voice call using the SLIC 115 and the handset 116, using the PCM I/F 205, and, in S731, it is detected that the user has pressed the FAX transmission start button in order to perform FAX transmission.

In S731, the CPU 101 controls the port 206 to set the circuit status to the status A shown in FIG. 3. Simultaneously, in S732, the CPU 101 stores information indicating that the PCM I/F 205 becomes not used, in the RAM 109. In S733, the CPU 101 starts FAX transmission using the digital modem 114, using the PCM I/F 205. Simultaneously, in S734, the CPU 101 stores again information indicating that the PCM I/F 205 is being used, in the RAM 109. In S736, the CPU 101 detects that the FAX transmission is completed. Simultaneously, in S737, the CPU 101 stores again information indicating that the PCM I/F 205 becomes not used, in the RAM 109.

In S738, the CPU 101 judges that both of the PCM I/F 204 and the PCM I/F 205 are being used for FAX communication. In S739, the CPU 101 instructs, via the SPI 203, the SLIC 115 to send BUSY TONE to the handset 116. In S740, BUSY TONE is output from the handset 116, and the CPU 101 ends the processing.

As described above, the image processing apparatus according to this embodiment includes an SLIC configured to control an analog telephone, a plurality of modems configured to control facsimile communication using deemed voice, a plurality of PCMI/Fs configured to input and output encoded voice data, and a plurality of selectors configured to connect the SLIC and one of the plurality of modems to one of the plurality of PCMI/Fs. Furthermore, this image processing apparatus controls the plurality of selectors according to requested processing to connect the SLIC and one of the plurality of modems to one of the plurality of PCMI/Fs, thereby performing the processing.

Specifically, when it is detected that a handset or a slave telephone is in an off-hook state, if it is determined that the PCM I/F 204 is not used, this image processing apparatus controls the selectors to connect the SLIC 115 to the PCM I/F 204, thereby starting a call. Subsequently, if a predetermined button (FAX transmission start button) is pressed during a call, the selectors are controlled to disconnect the SLIC 115 from the PCM I/F 204 and to connect the digital modem 113 to the PCM I/F 204, so that the facsimile communication using deemed voice is started.

Furthermore, when it is detected that a handset or a slave telephone is in an off-hook state, if it is determined that the PCM I/F 204 is being used and the PCM I/F 205 is not used, this image processing apparatus controls the selectors to connect the PCM I/F 205 to the SLIC 115, thereby starting a call. Subsequently, if the FAX transmission start button is pressed during a call, the selectors are controlled to disconnect the SLIC 115 from the PCM I/F 205 and to connect the digital modem 114 to the PCM I/F 205, so that the facsimile communication using deemed voice is started.

Furthermore, when it is detected that a handset or a slave telephone is in an off-hook state, if it is determined that both of the PCM I/Fs 204 and 205 are being used, this image processing apparatus sends a busy signal (BUSY TONE) to the SLIC 115.

In this manner, the image processing apparatus according to this embodiment can realize facsimile manual transmission by allowing two digital modems to exclusively use one SLIC.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-264498 filed Dec. 20, 2013, which is hereby incorporated by reference herein in its entirety.

What is claimed is:

1. An image processing apparatus capable of simultaneously performing a plurality of sessions at least including a voice call and facsimile communication using deemed voice, comprising:

a telephone control unit configured to control an analog telephone;

a plurality of modems configured to control the facsimile communication using deemed voice;

a plurality of pulse code modulation units configured to input and output encoded voice data;

a plurality of selectors configured to connect any of the telephone control unit and one of the plurality of modems to any of the plurality of pulse code modulation units; and a control unit configured to control the plurality of selectors according to requested processing to connect any of the telephone control unit and the plurality of modems to any of the plurality of pulse code modulation units, thereby performing the processing, wherein the plurality of modems include a first modem and a second modem, the plurality of pulse code modulation units include a first pulse code modulation unit and a second pulse code modulation unit, and the control unit includes a determination unit configured to determine whether or not each of the first and second pulse code modulation units is being used, when it is detected that a handset or a slave telephone provided in the image processing apparatus is in an off-hook state, wherein the control unit controls the plurality of selectors to connect the telephone control unit to the first pulse code modulation unit, in a case where the determination unit determines that the first pulse code modulation unit is not used, and controls the plurality of selectors to disconnect the telephone control unit from the first pulse code modulation unit and to connect the first modem to the first pulse code modulation unit, thereby starting the facsimile communication using deemed voice, in a case where it is detected that a predetermined button is pressed during a call.

2. An image processing apparatus capable of simultaneously performing a plurality of sessions at least including a voice call and facsimile communication using deemed voice, comprising:

a telephone control unit configured to control an analog telephone;

a plurality of modems configured to control the facsimile communication using deemed voice;

a plurality of pulse code modulation units configured to input and output encoded voice data;

a plurality of selectors configured to connect any of the telephone control unit and one of the plurality of modems to any of the plurality of pulse code modulation units; and a control unit configured to control the plurality of selectors according to requested processing to connect any of the telephone control unit and the plurality of modems to any of the plurality of pulse code modulation units, thereby performing the processing, wherein the plurality of modems include a first modem and a second modem, the plurality of pulse code modulation units include a first pulse code modulation unit and a second pulse code modulation unit, and the control unit includes a determination unit configured to determine whether or not each of the first and second pulse code modulation units is being used, when it is detected that a handset or a slave telephone provided in the image processing apparatus is in an off-hook state, wherein the control unit controls the plurality of selectors to connect the second pulse code modulation unit to the telephone control unit, in a case where the determination unit determines that the first pulse code modulation unit is being used and the second pulse code modulation unit is not used, and controls the plurality of selectors to disconnect the telephone control unit from the second pulse code modulation unit and to connect the second modem to the second pulse code modulation unit, thereby starting the facsimile communication using deemed voice, in a case where it is detected that a predetermined button is pressed during a call.

3. An image processing apparatus capable of simultaneously performing a plurality of sessions at least including a voice call and facsimile communication using deemed voice, comprising:

a telephone control unit configured to control an analog telephone;

a plurality of modems configured to control the facsimile communication using deemed voice;

a plurality of pulse code modulation units configured to input and output encoded voice data;

a plurality of selectors configured to connect any of the telephone control unit and one of the plurality of modems to any of the plurality of pulse code modulation units; and a control unit configured to control the plurality of selectors according to requested processing to connect any of the telephone control unit and the plurality of modems to any of the plurality of pulse code modulation units, thereby performing the processing, wherein the plurality of modems include a first modem and a second modem, the plurality of pulse code modulation units include a first pulse code modulation unit and a second pulse code modulation unit, and the control unit includes a determination unit configured to determine whether or not each of the first and second pulse code modulation units is being used, when it is detected that a handset or a slave telephone provided in the image processing apparatus is in an off-hook state, and sends a busy signal to the telephone control unit, in a case where the determination unit determines that the first and second pulse code modulation units are being used.

4. The image processing apparatus according to claim 1, further comprising a storage unit configured to store status information of the plurality of selectors, wherein the determination unit performs the determination based on the status information stored in the storage unit, and in a case where the control unit controls the plurality of selectors, the status information is updated.

5. A method for controlling an image processing apparatus capable of simultaneously performing a plurality of sessions at least including a voice call and facsimile communication using deemed voice, including a telephone control unit configured to control an analog telephone, a plurality of modems configured to control the facsimile communication using deemed voice, a plurality of pulse code modulation units configured to input and output encoded voice data, and a plurality of selectors configured to connect any of the telephone control unit and one of the plurality of modems to any of the plurality of pulse code modulation units, the method comprising:

causing a control unit to control the plurality of selectors according to requested processing to connect any of the telephone control unit and the plurality of modems to any of the plurality of pulse code modulation units, thereby performing the processing, wherein     the plurality of modems include a first modem and a second modem,     the plurality of pulse code modulation units include a first pulse code modulation unit and a second pulse code modulation unit, and     the method further comprises causing the control unit to:

determine whether or not each of the first and second pulse code modulation units is being used, when it is detected that a handset or a slave telephone provided in the image processing apparatus is in an off-hook state,         control the plurality of selectors to connect the telephone control unit to the first pulse code modulation unit, in a case where it is determined in the determining that the first pulse code modulation unit is not used, and         control the plurality of selectors to disconnect the telephone control unit from the first pulse code modulation unit and to connect the first modem to the first pulse code modulation unit, thereby starting the facsimile communication using deemed voice, in a case where it is detected that a predetermined button is pressed during a call.

6. A non-transitory computer-readable storage medium storing a computer program, for causing a computer to function as the image processing apparatus capable of simultaneously performing a plurality of sessions at least including a voice call and facsimile communication using deemed voice, including a telephone control unit configured to control an analog telephone, a plurality of modems configured to control the facsimile communication using deemed voice, a plurality of pulse code modulation units configured to input and output encoded voice data, and a plurality of selectors configured to connect any of the telephone control unit and one of the plurality of modems to any of the plurality of pulse code modulation units, the computer program comprising:

code to cause a control unit to control the plurality of selectors according to requested processing to connect any of the telephone control unit and the plurality of modems to any of the plurality of pulse code modulation units, thereby performing the processing, wherein     the plurality of modems include a first modem and a second modem,     the plurality of pulse code modulation units include a first pulse code modulation unit and a second pulse code modulation unit, and     the computer program further comprises code to cause the control unit to:

determine whether or not each of the first and second pulse code modulation units is being used, when it is detected that a handset or a slave telephone provided in the image processing apparatus is in an off-hook state,         control the plurality of selectors to connect the telephone control unit to the first pulse code modulation unit, in a case where it is determined in the determining that the first pulse code modulation unit is not used, and         control the plurality of selectors to disconnect the telephone control unit from the first pulse code modulation unit and to connect the first modem to the first pulse code modulation unit, thereby starting the facsimile communication using deemed voice, in a case where it is detected that a predetermined button is pressed during a call.

7. A communication apparatus capable of performing, via an IP network, a plurality of sessions at least including a voice call and facsimile communication by deemed voice, comprising:

a telephone control unit configured to control a telephone for performing the voice call;

a plurality of modems configured to control the facsimile communication;

a plurality of pulse code modulation units configured to input and output encoded voice data;

a detecting unit configured to detect an off hook;

a connecting unit configured to connect the telephone control unit to a pulse code modulation unit which is being not used from among the plurality of pulse code modulation units based on detecting the off hook by the detecting unit; and     a receiving unit configured to receive a facsimile transmission instruction,     wherein the connecting unit connects a modem which is being not used from among the plurality of modems to a pulse code modulation unit which is being not used from among the plurality of pulse code modulation units based on receiving the facsimile transmission instruction by the receiving unit.

8. The communication apparatus according to claim 7, wherein the connecting unit is a plurality of selectors.

9. The communication apparatus according to claim 8, further comprising a storage unit configured to store status information of the plurality of selectors,     wherein the connecting unit determines the pulse code modulation unit which is being not used from among the plurality of pulse code modulation units based on the status information stored in the storage unit.

10. A communication apparatus capable of performing, via an IP network, a plurality of sessions at least including a voice call and facsimile communication by deemed voice, comprising:

a telephone control unit configured to control a telephone for performing the voice call;

a plurality of modems configured to control the facsimile communication;

a plurality of pulse code modulation units configured to input and output encoded voice data;

a detecting unit configured to detect an off hook;

a connecting unit configured to connect the telephone control unit to a pulse code modulation unit which is being not used from among the plurality of pulse code modulation units based on detecting the off hook by the detecting unit; and     a receiving unit configured to receive a facsimile transmission instruction,     wherein the connecting unit connects a modem which is being not used from among the plurality of modems to the pulse code modulation unit based on receiving the facsimile transmission instruction by the receiving unit.

11. The communication apparatus according to claim 10, wherein the connecting unit is a plurality of selectors.

12. The communication apparatus according to claim 11, further comprising a storage unit configured to store status information of the plurality of selectors, wherein the connecting unit determines the pulse code modulation unit which is being not used from among the plurality of pulse code modulation units based on the status information stored in the storage unit.

* * * * *